(12) United States Patent
Hu et al.

(10) Patent No.: US 9,015,493 B2
(45) Date of Patent: Apr. 21, 2015

(54) MULTITENANT-AWARE PROTECTION SERVICE

(75) Inventors: Jason Xiaodong Hu, Renton, WA (US); Daniel W. Hitchcock, Bothell, WA (US); Gregory Kostal, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 581 days.

(21) Appl. No.: 12/883,414

(22) Filed: Sep. 16, 2010

(65) Prior Publication Data

US 2012/0072716 A1    Mar. 22, 2012

(51) Int. Cl.
G06F 21/00 (2013.01)
H04L 29/06 (2006.01)
G06F 21/60 (2013.01)

(52) U.S. Cl.
CPC .......... *H04L 63/0428* (2013.01); *G06F 21/602* (2013.01); *H04L 63/104* (2013.01); *G06F 2221/2115* (2013.01); *G06F 2221/2107* (2013.01)

(58) Field of Classification Search
None
See application file for complete search history.

(56) References Cited

U.S. PATENT DOCUMENTS

| | | | |
|---|---|---|---|
| 6,947,557 B1 * | 9/2005 | Megiddo et al. | 380/30 |
| 7,174,021 B2 | 2/2007 | Krishnaswamy et al. | |
| 7,178,021 B1 * | 2/2007 | Hanna et al. | 713/155 |
| 7,200,655 B2 * | 4/2007 | Hunt et al. | 709/223 |
| 7,443,985 B2 | 10/2008 | Krishnaswamy et al. | |
| 7,500,097 B2 | 3/2009 | Kostal et al. | |
| 7,509,489 B2 | 3/2009 | Kostal et al. | |
| 7,631,318 B2 | 12/2009 | Cottrille et al. | |
| 7,853,790 B2 * | 12/2010 | Gabryjelski et al. | 713/175 |
| 2005/0163136 A1 | 7/2005 | Chiu et al. | |
| 2007/0130130 A1 | 6/2007 | Chan et al. | |
| 2008/0056500 A1 * | 3/2008 | Bradley et al. | 380/279 |
| 2008/0270459 A1 | 10/2008 | Grewal et al. | |
| 2008/0307507 A1 * | 12/2008 | Conley et al. | 726/4 |
| 2009/0183000 A1 * | 7/2009 | Krig | 713/168 |
| 2009/0249440 A1 | 10/2009 | Platt et al. | |
| 2010/0063959 A1 | 3/2010 | Doshi et al. | |
| 2010/0125612 A1 | 5/2010 | Amradkar et al. | |

OTHER PUBLICATIONS

Chong et al., "Multi-Data Tenant Architecture," http://msdn.microsoft.com/en-us/library/aa479086.aspx.

(Continued)

*Primary Examiner* — David Le
(74) *Attorney, Agent, or Firm* — Timothy Churna; Sade Fashokun; Micky Minas

(57) ABSTRACT

Implementing a data protection service. One method includes receiving a request to provision a first tenant among a plurality of tenants managed by a single data protection service. A tenant is defined as an entity among a plurality of entities. A single data protection service provides data protection services to all tenants in the plurality of tenants. A first encryption key used to decrypt the first tenant's data at the data store is stored. The first encryption key is specific to the first tenant and thus cannot be used to decrypt other tenants' data at the data store from among the plurality of tenants. Rather each tenant in the plurality of tenants is associated with an encryption key, not usable by other tenants, used at the data store to decrypt data on a tenant and corresponding key basis.

20 Claims, 3 Drawing Sheets

(56) References Cited

OTHER PUBLICATIONS

Author Unknown, "Is This a Good Approach for Multi-Tenancy or Not?", http://elegantcode.com/2008/12/17/is-this-a-good-approach-for-multi-tenancy-or-not/.

Rane, "Securing SaaS Applications: A Cloud Security Perspective for Application Providers," http://www.infosectoday.com/Articles/Securing_SaaS_Applications.htm.

* cited by examiner

MULTITENANT-AWARE PROTECTION SERVICE

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system. Some of this application data can be received from network connections which include connections to the Internet. As the Internet has grown, it has become increasingly commonplace for data to move outside its environment of origin. Additionally, Internet storage locations may store large amounts of data, but the data may be partitioned in a fashion where certain portions are intended to be accessed by certain entities while being protected from other entities. Information rights management systems provide data protection.

Current information rights management systems provide protection based on a single, shared security root of trust, which root is shared by all participants in a system. For example, an information rights management system may have a central server storing data for multiple organizations. Once an organization is authenticated to the central server, a common key is used to access the data irrespective of the organization requesting data from the server.

This limitation requires a discrete system to be deployed wherever a security boundary must be expressed (for example, between two organizations), which has detrimental consequences for system scalability in scenarios such as online services.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method of implementing a data protection service. The method includes receiving a request for data from a first tenant from among a plurality of tenants managed by a single data protection service. A tenant is defined as an entity among a plurality of entities. A single data protection service provides data protection services to all tenants in the plurality of tenants. The method further includes identifying a first encryption key used to decrypt the first tenant's data at the data store. The first encryption key is specific to the first tenant and thus cannot be used to decrypt other tenants' data at the data store from among the plurality of tenants. Rather, each tenant in the plurality of tenants is associated with an encryption key, not usable by other tenants, used at the data store to decrypt data on a tenant and corresponding key basis. The method further includes decrypting data identified in the request for data using the first encryption key that is specific to the first tenant. The method further includes sending the data to the first tenant.

Another embodiment includes a method of implementing a data protection service. The method includes receiving a request to provision a first tenant among a plurality of tenants managed by a single data protection service. A tenant is defined as an entity among a plurality of entities. A single data protection service provides data protection services to all tenants in the plurality of tenants. A first encryption key used to decrypt the first tenant's data at the data store is stored. The first encryption key is specific to the first tenant and thus cannot be used to decrypt other tenants' data at the data store from among the plurality of tenants. Rather each tenant in the plurality of tenants is associated with an encryption key, not usable by other tenants, used at the data store to decrypt data on a tenant and corresponding key basis.

Another embodiment includes a data protection system. The system includes a data store. The data store includes sub-data stores, one for each tenant among a plurality of tenants. A tenant is defined as an entity among a plurality of entities. A single data protection service provides data protection services to all tenants in the plurality of tenants. Each sub-data store is accessible by using a unique key corresponding to the sub-data store. The system further includes a provisioning system configured to provision tenants among the plurality of tenants managed by a single data protection service. A front end system is also included in the system and is coupled to the provisioning system. The front end system is configured to store encryption keys used to decrypt the tenants' data at the data store. Each encryption key is specific to a given tenant and thus cannot be used to decrypt other tenants' data at the data store from among the plurality of tenants. Rather each tenant in the plurality of tenants is associated with an encryption key, not usable by other tenants, used at the data store to decrypt data on a tenant and corresponding key basis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein may implement a protection service provided by a single provider. However, the embodiments may implement different groups of trust for different organizations rather than using the same shared security group of trust for all organizations. For example, some embodiments may implement a system where the same key is not used for different companies' data even though the different companies' data is stored at the same protection service provider. In particular, embodiments may allow for multiple security roots of trust to be managed, segregated, and used within a single system.

Embodiments may implement the notion of a "tenant" by creating a unique security root of trust (for example in some embodiments, a certificate and associated cryptographic key pair) for each tenant. A tenant may be defined as an entity among a plurality of entities. For example, an enterprise among a plurality of enterprises or a company among a plurality of companies. The tenant construct allows for segregation within the system, ensuring that a specific security root of trust, and associated policies, are effective only for the relevant tenant.

Figure 1:
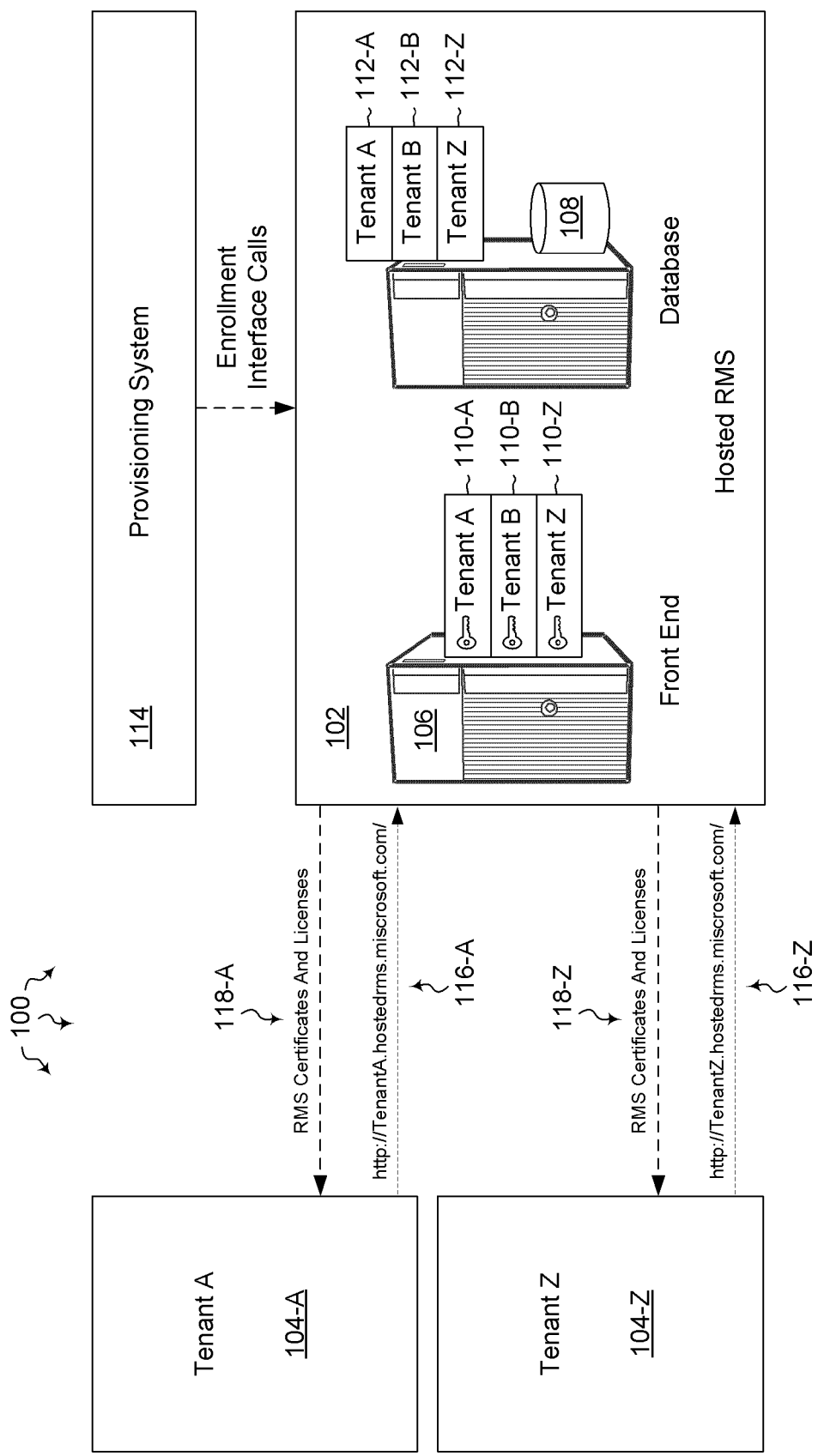
FIG. 1 illustrates a multi-tenant aware system.

Referring now to FIG. 1, an example is illustrated. In FIG. 1, a "Hosted RMS" (Hosted Rights Management Service) 102 is illustrated. The following discussion now illustrates aspects related to provisioning tenants (referred to generically as 104 although shown with specific designators in FIG. 1) within the Hosted RMS 102. Service provisioning and lifecycle relates specifically to the creation, modification, and/or deletion of a tenant 104 within Hosted RMS 102. In particular, FIG. 1 illustrates a Front End system 106 and a data store, such as a database system 108. The front end system 106 stores different keys (referred to generically herein as 110, but shown in FIG. 1 with specific designators). The different keys 110 may be used to access different sub-data stores (referred to generically herein as 112, but shown in FIG. 1 with specific designators) in a database 108. For example, key 110-A is used to access sub-data store 112-A storing data for tenant 104-A. Similarly, key 110-Z may be used to access sub-data store 112-Z storing data at the Hosted RMS 102 for tenant 104-Z. In some embodiments, the data that is stored per tenant includes data such as logs, encryption keys, and policy. However, in other embodiments, the data may include additionally or alternatively, data such as documents, e-mails, etc.

FIG. 1 illustrates a provisioning system 106. The provisioning system 114 connects to an interface of the Hosted RMS 102 to provide data to provision tenants 104. Various pieces of data may be used by this interface. For example, a customer "unique identifier" may be used. The unique identifier may allow the Hosted RMS 102 server to "group" tenants 104. For example, a customer may have several tenants (for purposes of key separation), but wants to consolidate their administration experience, such that the policies they define apply to all tenants in the group.

The DNS domain(s) for the tenant may be used by the interface. The location of the membership evaluation service for a given tenant may be used by the interface.

A name for the server licensor certificate may be provided to this interface in some embodiments. In some embodiments, this will be presented to end-users in publishing cases where a specific client licensor certificate is selected. A client licensor certificate grants an author permission to publish rights-protected content without being connected to the corporate network. In some embodiments, a client licensor certificate contains the client licensor public key, along with the client licensor private key that is encrypted by the public key of the author who requested the certificate. It may also contain the public key of the cluster that issued the certificate, which is signed by the private key of the cluster that issued the certificate. The client licensor private key may be used to sign publishing licenses that the author creates.

Once given provisioning information, the Hosted RMS 102 may store this information in its configuration database 108, using the tenant-defining attributes to ensure separation of tenant-specific configuration values. The Hosted RMS 102 will then complete the work of creating the tenant instance.

Creating a tenant instance may include storing the tenant-defining attributes, and the associated per-tenant attributes, in the Hosted RMS database 108. Creating a tenant instance may include making updates to accommodate storage of per-tenant configuration and logging information for that tenant. Creating a tenant instance may include generating (if not pre-generated) a server licensor certificate and corresponding key pair. Creating a tenant instance may include assigning a unique server licensor certificate and corresponding key pair to the tenant. Creating a tenant instance may include selecting a unique Service URL (for example, https://contoso.protection.messaging.microsoft.com), and associating this Service URL's domain name with the new tenant. Creating a tenant instance may include returning the selected Service URL to the caller of the interface.

This provisioning approach differs from some previous rights management systems in that the provisioning process acknowledges the notion of tenancy, and is therefore capable of creating and maintaining tenant-specific data (including the security root of trust) for multiple tenants within the same system. For example, FIG. 1 illustrates an example where multiple tenants 104 have been provisioned in an RMS 102. The Front End system 106 has separate keys 110, one for each tenant, and uses the separate keys 110 to access separate sub-data stores 112. In these keys are the same as the private key component in the per-tenant "server licensor certificate key pair". As described above and as shown in FIG. 1, this key (the private key component in the server licensor certificate) may be used to encrypt some of the tenant's configuration data in the database partition (specifically in some embodiments, the tenant's user keys).

The following now illustrates actions for associating a Hosted RMS caller, such as a tenant 104, with a Hosted RMS tenant key 110 for certification. In particular, certification refers to a tenant's authorization to call into the Hosted RMS 102 to access data in a sub-data store 112. A tenant-specific URL (illustrated generically as 116 but shown in FIG. 1 with specific designators) (e.g., https://contoso.protection.messaging.microsoft.com as illustrated above) can create this association. In the case of a Hosted RMS customer, this can occur via a Service Connection Point (SCP) (such as for example in an object directory, such as Active Directory®, which clients can query to obtain a URL for protection service) or registry key (such as for example in the case of Microsoft® digital rights management (MSDRM) available from Microsoft® corporation of Redmond Wash.), or a server-specific configuration (in the case of federated application servers). In the case of Microsoft® federated gateway (MFG)-federated user with a valid home realm configured, but no service connection point, this may occur via "Publish License Discovery," as the publish licenses for all content published against Hosted RMS 102 may bear the tenant-specific licensing URLs. In some embodiments, the Security Assertion Markup Language (SAML) claims received from the MFG will ensure security—in other words, security is enforced at the identity layer, and does not depend on the secrecy of, or ability to call, any particular URL.

The following illustrates associating a Hosted RMS caller with a Hosted RMS tenant key 110 for publishing. Content may be published based on a client licensor certificate, which is issued from a specific server licensor certificate, and which specifies the Intranet URL to be used in publication. The client licensor certificate can be given to the caller directly following certification. Client licensor certificates from Hosted RMS 102, and publish licenses for content protected using a client licensor certificate from a tenant instance of Hosted RMS 102, may bear an intranet and extranet URL corresponding to the Hosted RMS tenant 104.

The following illustrates associating a Hosted RMS caller with a Hosted RMS tenant key 110 for licensing. Each piece of content protected against the Hosted RMS 102 will bear tenant-specific licensing URLs, which will allow the consumer to call the appropriate licensing pipeline on the Hosted RMS server.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
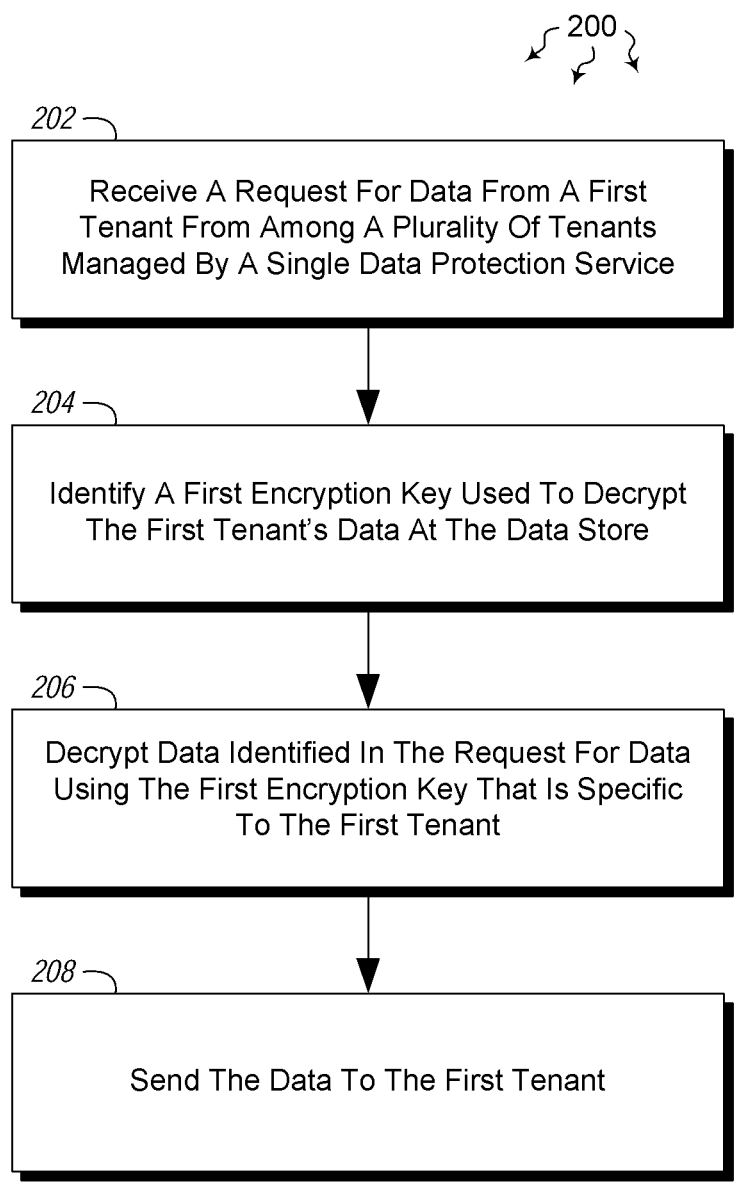
FIG. 2 illustrates a method of implementing a data protection service.

Referring now to FIG. 2, a method 200 is illustrated. The method 200 illustrates acts for implementing a data protection service. The method 200 includes receiving a request for data from a first tenant from among a plurality of tenants managed by a single data protection service (act 202). A tenant is defined as an entity among a plurality of entities. A single data protection service provides data protection services to all tenants in the plurality of tenants. For example, FIG. 1 illustrates a tenant 104-A sending a URL 116-A request to the Hosted RMS 102.

The method 200 further includes identifying a first encryption key used to decrypt the first tenant's data at the data store (act 204). The first encryption key is specific to the first tenant and thus cannot be used to decrypt other tenants' data at the data store from among the plurality of tenants. Rather each tenant in the plurality of tenants is associated with an encryption key, not usable by other tenants, used at the data store to decrypt data on a tenant and corresponding key basis. For example, as illustrated in FIG. 1, the key 110-A is the key used to decrypt data in the sub-data store 112-A for the tenant 104-A. Other keys are used for other tenants and the key 110-A may not be used to decrypt data for other tenants.

The method 200 further includes decrypting data identified in the request for data using the first encryption key that is specific to the first tenant (act 206). The method 200 further includes sending the data to the first tenant (act 208).

The method 200 may be practiced where each tenant is defined as a union of one or more namespaces, a unique server key, specific to each tenant, and tenant specific URL.

The method 200 may be practiced where the request for data from a first tenant from among a plurality of tenants managed by a single data protection service includes a customer unique identifier allowing the data protection service to group tenants in to a group for key separation among tenants in the group while consolidating administration experience for all tenants in the group.

The method 200 may be practiced where the request for data from a first tenant from among a plurality of tenants managed by a single data protection service includes a tenant-specific URL. In particular, as shown in FIG. 1, a tenant specific URL 116 may be used for requesting data. In some embodiments, a tenant-specific licensing URL to allow a consumer to call an appropriate licensing pipeline.

The method 200 may be practiced where the request for data from a first tenant from among a plurality of tenants managed by a single data protection service includes Security Assertion Markup Language (SAML) claims. This can be done to ensure security is enforced at the identity layer, and that security does not depend on the secrecy of, or ability to call, any particular URL.

Figure 3:
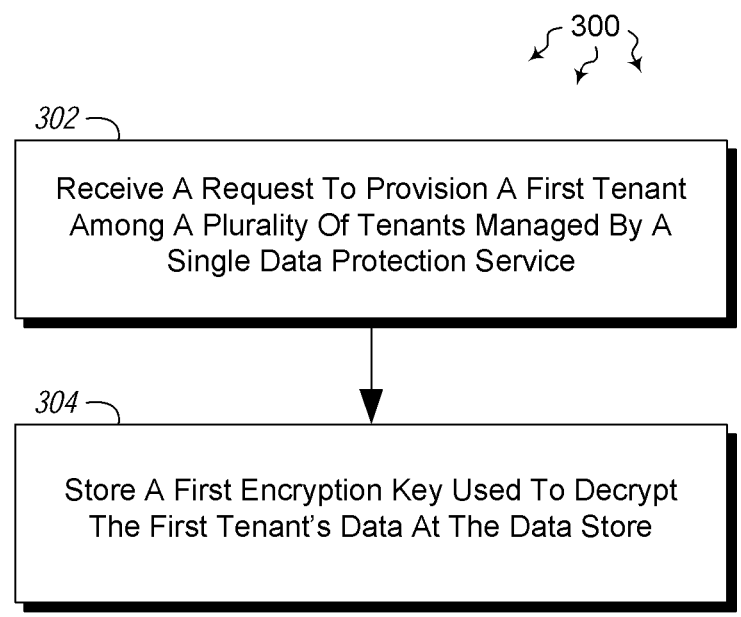
FIG. 3 illustrates another method of implementing a data protection service.

Referring now to FIG. 3, another method 300 is illustrated. The method 300 includes acts for implementing a data protection service. The method 300 includes receiving a request to provision a first tenant among a plurality of tenants managed by a single data protection service (act 302). A tenant is defined as an entity among a plurality of entities. A single data protection service provides data protection services to all tenants in the plurality of tenants.

The method 300 further includes storing a first encryption key used to decrypt the first tenant's data at the data store (act 304). The first encryption key is specific to the first tenant and thus cannot be used to decrypt other tenants' data at the data store from among the plurality of tenants. Rather each tenant in the plurality of tenants is associated with an encryption key, not usable by other tenants, used at the data store to decrypt data on a tenant and corresponding key basis.

The method 300 may be practiced where receiving a request to provision a first tenant among a plurality of tenants managed by a single data protection service includes receiving a customer unique identifier allowing the data protection service to group tenants into a group for key separation among tenants in the group while consolidating administration experience for all tenants in the group.

The method 300 may further include generating a tenant-specific URL. The tenant-specific URL may be sent to the specific tenant. FIG. 1 illustrates the use of tenant-specific URLs 116 that can be used by a tenant 104. In some embodiment, the tenant specific URL 104 is a tenant-specific licensing URL to allow a consumer to call an appropriate licensing pipeline to receive certificates and licenses 118.

The method 300 may be practiced where receiving a request to provision a first tenant among a plurality of tenants managed by a single data protection service includes receiving one or more DNS domains for the tenant.

The method 300 may be practiced where receiving a request to provision a first tenant among a plurality of tenants managed by a single data protection service includes receiving a name for a server licensor certificate to allow a client licensor to grant permission to publish rights-protected content. Embodiments may further include generating a server licensor certificate and corresponding key pair and assigning the licensor certificate and corresponding key pair to a tenant.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware and software, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of implementing a data protection service, the method comprising:
   receiving a request for data from a first tenant from among a plurality of tenants managed by a single data protection service, wherein a tenant is defined as an entity among a plurality of entities, and where a single data protection service provides data protection services to all tenants in the plurality of tenants, wherein, for each tenant in the plurality of tenants, the data protection service maintains a unique security root of trust comprising a unique client certificate and associated unique public and private cryptographic key pair, wherein each of the public and private cryptographic keys in the key pair are unique and specific to the each tenant;
   identifying a first encryption key stored at a data store used to decrypt the first tenant's data at the data store, wherein the first encryption key is specific to the first tenant and cannot be used to decrypt any other tenants' data at the data store from among the plurality of tenants, but rather wherein each tenant in the plurality of tenants is associated with an encryption key, not usable by other tenants, used at the data store to decrypt data on a tenant and corresponding key basis;
   decrypting data identified in the request for data using the first encryption key that is specific to the first tenant; and
   sending the data to the first tenant.

2. The method of claim 1, wherein each tenant is defined as a union of one or more namespaces, a unique server key, specific to each tenant, and tenant specific URL.

3. The method of claim 1, wherein the request for data from a first tenant from among a plurality of tenants managed by a single data protection service comprises a customer unique identifier allowing the data protection service to group tenants in to a group for key separation among tenants in the group while consolidating administration experience for all tenants in the group.

4. The method of claim 1, wherein the request for data from a first tenant from among a plurality of tenants managed by a single data protection service comprises a tenant-specific URL.

5. The method of claim 1, wherein the request for data from a first tenant from among a plurality of tenants managed by a single data protection service comprises a tenant-specific licensing URL to allow a consumer to call an appropriate licensing pipeline.

6. The method of claim 1, wherein the request for data from a first tenant from among a plurality of tenants managed by a single data protection service comprises Security Assertion Markup Language (SAML) claims to ensure security is enforced at the identity layer, and does not depend on the secrecy of, or ability to call, any particular URL.

7. A method of implementing a data protection service, the method comprising:
receiving a request to provision a first tenant among a plurality of tenants managed by a single data protection service, wherein a tenant is defined as an entity among a plurality of entities, and where a single data protection service provides data protection services to all tenants in the plurality of tenants;
generating a unique security root of trust comprising a unique client certificate and associated unique public and private cryptographic key pair for the first tenant, wherein, for each tenant in the plurality of tenants, the data protection service maintains a unique security root of trust comprising a unique client certificate and associated unique public and private cryptographic key pair, wherein each of the public and private cryptographic keys in the key pair are unique and specific to the each tenant; and
storing a first encryption key at a data store used to decrypt the first tenant's data at the data store, and wherein the first encryption key is specific to the first tenant and thus cannot be used to decrypt other tenants' data at the data store from among the plurality of tenants, but rather wherein each tenant in the plurality of tenants is associated with an encryption key, not usable by other tenants, used at the data store to decrypt data on a tenant and corresponding key basis.

8. The method of claim 7, wherein receiving a request to provision a first tenant among a plurality of tenants managed by a single data protection service comprises receiving a customer unique identifier allowing the data protection service to group tenants into a group for key separation among tenants in the group while consolidating administration experience for all tenants in the group.

9. The method of claim 7 further comprising, generating a tenant-specific URL.

10. The method of claim 9 further comprising, sending the tenant-specific URL to a tenant for the tenant-specific URL.

11. The method of claim 9, wherein the tenant specific URL is a tenant-specific licensing URL to allow a consumer to call an appropriate licensing pipeline.

12. The method of claim 7, wherein receiving a request to provision a first tenant among a plurality of tenants managed by a single data protection service comprises receiving one or more DNS domains for the tenant.

13. The method of claim 7, wherein receiving a request to provision a first tenant among a plurality of tenants managed by a single data protection service comprises receiving a name for a server licensor certificate to allow a client licensor to grant permission to publish rights-protected content.

14. The method of claim 12, further comprising generating a server licensor certificate and corresponding key pair and assigning the licensor certificate and corresponding key pair to a tenant.

15. A data protection system in a computing environment, the system comprising:
a data store, wherein the data store comprises a plurality of sub-data stores, one for each tenant among a plurality of tenants, wherein a tenant is defined as an entity among a plurality of entities, and where a single data protection service provides data protection services to all tenants in the plurality of tenants, wherein each sub-data store is accessible by using a unique key corresponding to the sub-data store;
a provisioning system configured to provision tenants among the plurality of tenants to be managed by a single data protection service, wherein provisioning a tenant comprises generating a unique security root of trust comprising a unique client certificate and associated unique public and private cryptographic key pair for the first tenant, such that, for each tenant in the plurality of tenants, the data protection service maintains a unique security root of trust comprising a unique client certificate and associated unique public and private cryptographic key pair, wherein each of the public and private cryptographic keys in the key pair are unique and specific to the each tenant; and
a front end system coupled to the provisioning system, wherein the front end system is configured to store encryption keys at the data store used to decrypt the tenants' data at the data store, and wherein each encryption key is specific to a given tenant and thus cannot be used to decrypt other tenants' data at the data store from among the plurality of tenants, but rather wherein each tenant in the plurality of tenants is associated with an encryption key, not usable by other tenants, used at the data store to decrypt data on a tenant and corresponding key basis.

16. The system of claim 15, wherein the provisioning system is configured to generate a tenant-specific URL.

17. The system of claim 16, wherein the provisioning system is configured to send the tenant-specific URL to a tenant.

18. The system of claim 16, wherein the tenant-specific URL is a tenant-specific licensing URL to allow a consumer to call an appropriate licensing pipeline.

19. The system of claim 15, wherein the provisioning system is configured to generate a server licensor certificate and corresponding key pair and assign the licensor certificate and corresponding key pair to a tenant.

20. The system of claim 15, wherein the front end system comprises one or more modules configured to enforce security at an identity layer such that security does not depend on the secrecy of, or ability to call, any particular URL.

* * * * *